United States Patent
Chorvath et al.

(10) Patent No.: US 6,479,580 B1
(45) Date of Patent: Nov. 12, 2002

(54) POLYOLEFIN THERMOPLASTIC SILICONE ELASTOMERS EMPLOYING RADICAL CURE

(75) Inventors: Igor Chorvath, Midland, MI (US); Dean Curtis Gray, Midland, MI (US); Michal Kang-Jen Lee, Midland, MI (US); Thomas John Tangney, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 2 days.

(21) Appl. No.: 09/843,906

(22) Filed: Apr. 30, 2001

(51) Int. Cl.$^7$ ................................................ C08L 83/07
(52) U.S. Cl. ................... 524/588; 524/866; 524/860; 524/291; 524/343; 524/342
(58) Field of Search ................... 524/588, 860, 524/866, 343, 291, 342

(56) References Cited

U.S. PATENT DOCUMENTS

| | | | |
|---|---|---|---|
| 4,164,491 A | 8/1979 | Itoh et al. | |
| 4,500,688 A | 2/1985 | Arkles | 525/431 |
| 4,692,486 A | 9/1987 | Gumumus | 524/100 |
| 4,695,602 A | 9/1987 | Crosby et al. | 524/439 |
| 4,714,739 A | 12/1987 | Arkles | 525/92 |
| 4,831,071 A | 5/1989 | Ward et al. | 524/401 |
| 6,013,715 A * | 1/2000 | Gornowicz et al. | 524/492 |
| 6,015,858 A * | 1/2000 | Gornowicz et al. | 524/545 |
| 6,153,691 A | 11/2000 | Gornowicz et al. | 524/861 |
| 6,362,287 B1 | 3/2002 | Chorvath et al. | |
| 6,362,288 B1 | 3/2002 | Brewer et al. | |
| 6,417,293 B1 | 7/2002 | Chorvath et al. | |

FOREIGN PATENT DOCUMENTS

| EP | 0 506 465 A2 | 9/1992 | C08L/67/02 |
|---|---|---|---|
| EP | 0 651 009 A1 | 5/1995 | C08L/21/00 |

* cited by examiner

Primary Examiner—Margaret G. Moore
(74) Attorney, Agent, or Firm—Alan Zombeck

(57) ABSTRACT

Polyolefin thermoplastic elastomers are disclosed which are prepared by;

(I) mixing
  (A) a thermoplastic resin comprising more than 50 percent by volume of a polyolefin resin, said thermoplastic resin having a softening point of 23° C. to 300° C.;
  (B) a silicone base comprising
    (B') 100 parts by weight of a diorganopolysiloxane gum having a plasticity of at least 30 and having an average of at least 2 alkenyl groups per molecule, and optionally,
    (B") up to 200 parts by weight of a reinforcing filler, the weight ratio of said silicone base to said polyolefin thermoplastic resin is from 35:65 to 85:15;
  (C) a radical initiator, present in an amount sufficient to cure said diorganopolysiloxane gum (B'); and
(II) dynamically vulcanizing said diorganopolysiloxane gum, wherein at least one property of the thermoplastic elastomer selected from tensile strength or elongation is at least 25% greater than the respective property for a corresponding simple blend wherein said diorganopolysiloxane gum is not cured and said thermoplastic elastomer has an elongation of at least 25%.

32 Claims, No Drawings

POLYOLEFIN THERMOPLASTIC SILICONE ELASTOMERS EMPLOYING RADICAL CURE

FIELD OF THE INVENTION

This invention provides a method of preparing a thermoplastic elastomer composition comprising mixing a silicone gum, with or without filler, and a thermoplastic resin containing more than 50% by volume of a polyolefin resin having a softening point of 23° C. to 300° C., and dynamically vulcanizing the silicone gum via a radical initiator.

BACKGROUND OF THE INVENTION

Thermoplastic elastomer vulcanizates (TPV), represent a known class of thermoplastic elastomers. These materials are prepared by a process known as dynamic vulcanization wherein an elastomer is dispersed in a thermoplastic resin and the elastomer is subsequently cured with the aid of a crosslinking agent and/or catalyst during the mixing process. A number of such TPV systems are known in the art, including some wherein the crosslinked elastomeric component can be a silicone polymer while the thermoplastic component is an organic (i.e., non-silicone) polymer. For example, Arkles, in U.S. Pat. No. 4,500,688, discloses semi-interpenetrating networks (semi-IPN) wherein a vinyl-containing silicone fluid having a viscosity of 500 to 100,000 cS is dispersed in a conventional thermoplastic resin. The vinyl-containing silicone is vulcanized in the thermoplastic during melt mixing according to a chain extension or crosslinking mechanism, which employs a silicon hydride-containing silicone component. Typical thermoplastics mentioned include polyamides, polyurethanes, styrenics, polyacetals and polycarbonates. This disclosure is expanded by Arkles in U.S. Pat. No. 4,714,739 to include the use of hybrid silicones which contain unsaturated groups and are prepared by reacting a hydride-containing silicone with an organic polymer having unsaturated functionality. Although Arkles discloses a silicone fluid content ranging from 1 to 40 weight percent (1 to 60% in the case of the '739 patent), there is no suggestion of any criticality as to these proportions or to the specific nature of the organic resin.

Crosby et al., in U.S. Pat. No. 4,695,602, teach composites wherein a silicone semi-IPN vulcanized via a hydrosilation reaction is dispersed in a fiber-reinforced thermoplastic resin having a high flexural modulus. The silicones employed are of the type taught by Arkles, cited supra, and the composites are said to exhibit improved shrinkage and warpage characteristics relative to systems, which omit the semi-IPN.

Ward et al., in U.S. Pat. No. 4,831,071, discloses a method for improving the melt integrity and strength of a high modulus thermoplastic resin to provide smooth-surfaced, high tolerance profiles when the modified resin is melt-drawn. As in the case of the disclosures to Arkles et al., cited supra, a silicone mixture is cured via a hydrosilation reaction after being dispersed in the resin to form a semi-IPN, and the resulting composition is subsequently extruded and melt-drawn.

U.S. Pat. No. 6,013,715 to Gornowicz et al. teaches the preparation of thermoplastic silicone vulcanizates (TPSiV) wherein a silicone gum (or filled silicone gum) is dispersed in either a polyolefin or a poly(butylene terephthalate) resins and the gum is subsequently dynamically vulcanized therein via a hydrosilation cure system. The resulting elastomers exhibit an ultimate elongation at break of at least 25% and have significantly improved mechanical properties over the corresponding simple blends of resin and silicone gum in which the gum is not cured (i.e., physical blends).

EP 651,009A1 to Sumitomo Bakelite Co., published May 3,1995, discloses a thermoplastic elastomer composition which is prepared by dynamically vulcanizing a mixture comprising an unsaturated organic (i.e., non-silicone) rubber, a thermoplastic resin, an SiH-containing crosslinker, a hydrosilating catalyst and a compatibilizing agent.

U.S. Pat. No. 6,153,691, discloses the preparation of TPSiVs by a condensation cure mechanism. The silicone component employed contains silanol (—SiOH) functionality and is cured with an organohydrido functional crosslinker in the presence of, e.g., an organotin condensation catalyst.

EP 506,465 A2 to Japan Synthetic Rubber Co. discloses thermoplastic elastomers having improved mechanical properties, resistance to heat and oil, and compression set. These systems are prepared by mixing a thermoplastic polyester elastomer with a rubber and dynamically vulcanizing the rubber as these components are mixed. Various stabilizers and compatibilizers may be incorporated in the compositions, but no criticality is ascribed to these optional ingredients. Further, this publication only teaches the preparation of a thermoplastic elastomer from another thermoplastic.

Thus, although the above cited publications disclose the preparation of thermoplastic elastomer compositions using various thermoplastic resins as the matrix and a silicone phase which is dynamically vulcanized therein, neither these publications teach polyolefin TPSiV compositions cured by a radical reaction.

SUMMARY OF THE INVENTION

The present invention is a method for preparing thermoplastic elastomers by
(I) mixing
  (A) a thermoplastic resin comprising more than 50 percent by volume of a polyolefin resin, said thermoplastic resin having a softening point of 23° C. to 300° C.;
  (B) a silicone base comprising
    (B') 100 parts by weight of a diorganopolysiloxane gum having a plasticity of at least 30 and having an average of at least 2 alkenyl groups per molecule, and optionally,
    (B") up to 200 parts by weight of a reinforcing filler, wherein the weight ratio of said silicone base to said thermoplastic resin is from 35:65 to 85:15;
  (C) a radical initiator, in an amount sufficient to cure said diorganopolysiloxane gum (B'); and
(II) dynamically vulcanizing said diorganopolysiloxane gum,
wherein said thermoplastic elastomers have an elongation of at least 25% and at least one property of said thermoplastic elastomers selected from tensile strength or elongation is at least 25% greater than the respective property for a corresponding simple blend wherein said diorganopolysiloxanes gum is not cured.

The invention further relates to thermoplastic elastomers prepared by the above method.

DETAILED DESCRIPTION OF THE INVENTION

Component (A) of the present invention is a thermoplastic resin comprising more than 50% by volume of a polyolefin resin having a softening point of 23° C. to 300° C. As used herein, "softening point" corresponds to the respective melting point of the thermoplastic resin if the resin is at least partially crystalline, or corresponds to the glass transition temperature when the thermoplastic resin is completely amorphous. Preferably, the softening point is between 50° C. and 300° C. and most preferably between 100° C. and 250° C.

The polyolefin resins may be selected from polyethylene, polypropylene, or styrenic block copolymers. The polyolefin resins may be selected from homopolymers of olefins as well as random graft or block copolymers of one or more olefins with each other and/or up to about 40 mole percent of one or more monomers, which are copolymerizable with the olefins. Examples of suitable polyolefin resins include homopolymers of ethylene, propylene, butene-1, isobutylene, hexene, 1,4-methylpentene-1, pentene-1, octene-1, nonene-1 and decene-1, inter alia. These polyolefins can be prepared using peroxide, Ziegler-Natta or metallocene catalysts, as well known in the art. Copolymers of two or more of the above mentioned olefins may also be employed as Component (A) and they may also be copolymerized with, e.g., vinyl or diene compounds or other such compounds which can be copolymerized with the olefins.

Specific examples of suitable copolymers are ethylene-based copolymers, such as ethylene-propylene copolymers, ethylene-butene-1 copolymers, ethylene-hexene-1 copolymers, ethylene-octene-1 copolymers, ethylene-butene-1 copolymers and copolymers of ethylene with two or more of the above mentioned olefins.

The polyolefin resin may also be a blend of two or more of the above-mentioned homopolymers or copolymers. For example, the blend can be a uniform mixture of one of the above systems with one or more of the following: polypropylene, high pressure, low density polyethylene, high density polyethylene, polybutene-1 and polar monomer-containing olefin copolymers such as ethylene/acrylic acid copolymers, ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers and ethylene/acrylic acid/vinyl acetate terpolymers, inter alia.

Preferred polyolefins include polyethylene (PE) polymers such as low pressure, substantially linear, ethylene homopolymers and copolymers of ethylene with alpha-olefins having 3 to 10 carbon atoms, such copolymers being known as linear low density polyethylene (LLDPE) in the art. Preferably, these systems have a density of about 0.85 to 0.97 g/cc, more preferably 0.875 to 0.930 g/cc, and weight average molecular weight of about 60,000 to about 1,000,000.

Other preferred polyolefins include polypropylene (PP) resins, such as atactic, syndiotactic or isotactic PP. These are typically homopolymers of propylene or interpolymers of propylene with minor proportions of ethylene. Such PP systems can have the ethylene polymerized randomly with propylene units or a number of ethylene units may be linked to form a block copolymer.

Thermoplastic elastomeric styrenic block copolymers of the invention are exemplified by styrene-butadiene-styrene block copolymers (SBS), styrene-ethylene-butylene-styrene copolymers (SEBS), styrene-isoprene-styrene copolymers (SIS), hydrogenated versions of the above, and the like. Specific commercial representatives include such resins as KRATON® D1102 and KRATON® FG1901X from Shell.

It is also contemplated that the thermoplastic resin can be a blend of a polyolefin resin with a non-polyolefin thermoplastic resin such that the polyolefin resin comprises more than 50 percent of the blend volume. As in the case of the polyolefin resin, this optional resin can be any thermoplastic resin having a softening point of at least about 230° C., preferably 23° C. to 300° C.

Component (B) is a silicone base comprising
(B') 100 parts by weight of a diorganopolysiloxane gum having a plasticity of at least 30 and having an average of at least 2 alkenyl groups per molecule, and optionally,
(B") up to 200 parts by weight of a reinforcing filler, wherein the weight ratio of said silicone base to said thermoplastic resin is from 35:65 to 85:15.

Diorganopolysiloxane gum (B') is a high consistency (gum) polymer or copolymer, which contains at least 2 alkenyl groups having 2 to 20 carbon atoms per molecule. Examples of the alkenyl group include vinyl, allyl, butenyl, pentenyl, hexenyl and decenyl. The position of the alkenyl group is not critical and it may be bonded at the molecular chain terminals, in non-terminal positions on the molecular chain or at both positions. It is preferred that the alkenyl group is vinyl or hexenyl and that this group is present at a level of 0.001 to 3 weight percent, preferably 0.01 to 1 weight percent, in the diorganopolysiloxane gum.

The remaining (i.e., non-alkenyl) silicon-bonded organic groups in component (B') are independently selected from hydrocarbon or halogenated hydrocarbon groups, which contain no aliphatic unsaturation. These may be exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl, which are selected such that the diorganopolysiloxane gum (B') has a glass temperature (and/or melt point) which is below room temperature. Preferably, methyl groups make up at least 50, more preferably at least 90, mole percent of the non-unsaturated silicon-bonded organic groups in component (B').

Diorganopolysiloxane gum (B') can be a homopolymers, copolymer, or terpolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Specific illustrations of organopolysiloxane (B') include: trimethylsiloxy-endblocked dimethylsiloxane-methylhexenylsiloxane copolymers; dimethylhexenylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane -methylvinylsiloxane copolymers; and similar copolymers wherein at least one end group is dimethylhydroxysiloxy. Preferred systems for low temperature applications include methylphenylsiloxanedimethylsiloxane-methylvinylsiloxane copolymers and diphenylsiloxane-dimethylsiloxane-methylvinylsiloxane copolymers, particularly wherein the molar content of the dimethylsiloxane units is about 93%.

Although not to be limited by any theory, the present inventors believe the vinyl groups on the diorganopolysiloxane gum participate in the cure chemistry of the silicone base when the thermoplastic elastomer is dynamically vulcanized. One skilled in the art however will recognize that free radical cure of organopolysiloxanes not containing any vinyl groups is possible under certain conditions. Thus, the present inventors also believe vinyl free organopolysiloxanes can be used as the silicone base component. For example, the present inventors believe a polydimethylsiloxane homopolymer, which is terminated with a hydroxy or methyl group at each end of its molecule, would be operable in the present invention utilizing free radical cure chemistry.

Component (B') may also comprise combinations of two or more organopolysiloxanes. Most preferably, component (B') is a polydimethylsiloxane homopolymer, which is terminated with a vinyl group at each end of its molecule or is such a homopolymer which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method 926. The plasticity number, as used herein, is defined as the thickness in millimeters=100 of a cylindrical test specimen 2 cm$^3$ in volume and approximately 10 mm in height after the specimen has been subjected to a compressive load of 49 Newtons for three minutes at 250° C. When the plasticity of this component is less than about 30, as in the case of the low viscosity fluid siloxanes employed by Arkles, cited supra, the TPSiVs prepared by dynamic vulcanization according to the instant method exhibit poor uniformity such that at high silicone contents (e.g., 50 to 70 weight percent) there are regions of essentially only silicone and those of essentially only thermoplastic resin, and the blends are weak and friable. The gums of the present invention are considerably more viscous than the silicone fluids employed in the prior art. For example, silicones contemplated by Arkles, cited supra, have an upper viscosity limit of 100,000 cS (0.1 m$^2$/s) and, although the plasticity of fluids of such low viscosity are not readily measured by the ASTM D 926 procedure, it was determined that this corresponds to a plasticity of approximately 24. Although there is no absolute upper limit on the plasticity of component (B'), practical considerations of processability in conventional mixing equipment generally restrict this value. Preferably, the plasticity number should be about 100 to 200, most preferably about 120 to 185.

Methods for preparing high consistency unsaturated group-containing diorganopolysiloxane gums are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Optional component (B") is a reinforcing filler which is known to reinforce diorganopolysiloxane gum (B') and is preferably selected from finely divided, heat stable minerals such as fumed and precipitated forms of silica, silica aerogels and titanium dioxide having a specific surface area of at least about 50 m$^2$/gram. The fumed form of silica is a preferred reinforcing filler based on its high surface area, which can be up to 700 m$^2$/gram, more preferably a fumed silica having a surface area of 50 to 400 m$^2$/g, most preferably 200 to 380 m$^2$/g. Preferably, the fumed silica filler is treated to render its surface hydrophobic, as typically practiced in the silicone rubber art. This can be accomplished by reacting the silica with a liquid organosilicon compound, which contains silanol groups or hydrolyzable precursors of silanol groups. Compounds that can be used as filler treating agents, also referred to as anti-creeping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated diorganopolysiloxane gum having an average degree of polymerization (DP) of 2 to about 100, more preferably about 2 to about 10 and it is used at a level of about 5 to 50 parts by weight for each 100 parts by weight of the silica filler. When Component (B') is vinyl-functional or hexenyl-functional polydimethylsiloxane, this treating agent is preferably a hydroxy-terminated polydimethylsiloxane.

For the purposes of the present invention, 5 to 200 parts by weight, preferably 5 to 150 and most preferably 10 to 100 parts by weight, of the optional reinforcing filler (B") are uniformly blended with 100 parts by weight of gum (B') to prepare silicone base (B). This blending is typically carried out at room temperature using a two-roll mill, internal mixer or other suitable device, as well known in the silicone rubber art. Alternatively, the silicone base can be formed in-situ during mixing prior to dynamic vulcanization of the gum, as further described infra. In the latter case, the temperature of mixing is kept below the softening point of resin (A) until the reinforcing filler is well dispersed in the diorganopolysiloxane gum.

Component (C) is a radical initiator, present in an amount sufficient to cure said diorganopolysiloxane gum (B'). Radical initiator (C) of the present invention is a compound, which decomposes at elevated temperature to form radical species. The latter promotes the crosslinking reaction between the alkenyl groups of diorganopolysiloxane gum (B') during the dynamic vulcanization step of the instant method. This component may be illustrated by known azo compounds, carbon compounds and organic peroxy compounds, such as hydroperoxides, diacyl peroxides, ketone peroxides, peroxyesters, dialkyl peroxides, diaryl peroxides, aryl-alkyl peroxides, peroxydicarbonates, peroxyketals, peroxy acids, acyl alkylsulfonyl peroxides and alkyl monoperoxydicarbonates.

For the purposes of the present invention, radical initiator (C) is selected such that the difference between the six-minute half life temperature of the radical initiator and the process temperature is between −60° C. and 40° C. That is, the following condition is satisfied: 31 60° C.≦{T(6)−T(O)}≦40° C., wherein T(6) represents the temperature (° C.) which the radical initiator has a half life of 6 minutes and T(O) represents the processing temperature (° C.) prior to radical initiator addition (i.e., the actual temperature of the mixture of components (A) through (D)). The value of T(6) is available from the manufacturer of the radical initiator or can be determined by methods known in the art. After the radical initiator is introduced, the temperature generally increases slightly as dynamic vulcanization takes place unless intentional cooling is applied. However, such cooling is not generally required unless temperature increases dramatically (e.g., more than about 30° C.).

Specific non-limiting examples of suitable radical initiators include 2,2'-azobisisobutyronitrile, 2,2'-azobis(2- methylbutyronitrile), dibenzoyl peroxide, tert-amyl peroxyacetate, 1,4-di(2-tert-butylperoxyisopropyl)benzene, tert-butyl cumyl peroxide, 2,4,4-trimethylpentyl-2 hydroperoxide, diisopropylbenzene monohydroperoxide, cumyl hydroperoxide, tert-butyl hydroperoxide, tert-amyl hydroperoxide, 1,1-di(tert-butylperoxy)cyclohexane, tert-butylperoxy isopropyl carbonate, tert-amyl peroxybenzoate, dicumyl peroxide, 2,5-dimethyl-2,5-di-(tert-butylperoxy) hexane bis(1-methyl-1-phenylethyl) peroxide, 2,5-dimethyl-2,5-di-(tert-butylperoxy)hexyne-3, di-tert-butyl peroxide, α,α-dimethylbenzyl hydroperoxide and 3,4-dimethyl-3,4-diphenylhexane.

Radical initiator (C) is used in an amount sufficient to cure diorganopolysiloxane gum (B') and this amount can be optimized for a given system by those skilled in the art using routine experimentation. When the amount is too low, insufficient crosslinking takes place and mechanical properties will be poor. It is readily determined by a few simple experiments for the system under consideration. On the other hand, when excess radical initiator is added, it is uneconomical and undesirable side reactions, such as polymer degradation, tend to occur. Radical initiator (C) is preferably added at a level of 0.05 to 6 parts by weight, more preferably 0.2 to 3 parts by weight, for each 100 parts by weight of diorganopolysiloxane gum (B').

A stabilizer (D) can be added to the mixing step (I) as an optional component. Stabilizer (D) is at least one organic compound selected from hindered phenols; thioesters; hindered amines; 2,2'-(1,4-phenylene)bis(4H-3,1-benzoxazin-4-one); or 3,5-di-tert-butyl-4-hydroxybenzoic acid, hexadecyl ester.

For the purposes of the present invention, a hindered phenol is an organic compound having at least one group of the formula

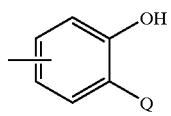

(i)

per molecule, wherein Q is a monovalent organic group having 1 to 24 carbon atoms selected from hydrocarbon groups, hydrocarbon groups which optionally contain heteroatoms selected from sulfur, nitrogen or oxygen or halogen-substituted versions of the aforementioned groups. Examples of Q include groups such as alkyl, aryl, alkylaryl, arylalkyl, cycloalkyl and halogen-substituted version thereof; alkoxy groups having 1 to 24 carbon atoms, such as methoxy or t-butoxy; and hydrocarbon groups having 2 to 24 carbon atoms which contain heteroatoms (e.g., —CH$_2$—S—R", —CH$_2$—O—R" or —CH$_2$—C(O)OR", wherein R" is a hydrocarbon group having 1 to 18 carbon atoms). Further, although not explicitly shown in formula (i), it is also contemplated that the benzene ring may additionally be substituted with one or more of the above described Q groups. The residue of the organic compound to which group (i) is chemically bonded is not critical as long as it does not contain moieties which would interfere with the dynamic vulcanization, described infra. For example, this residue may be a hydrocarbon, a substituted hydrocarbon or a hetero atom-containing hydrocarbon group of the appropriate valence. It is also contemplated that the group according to formula (i) can be attached to hydrogen to form an organophenol. Preferably, the hindered phenol compound has a number average molecular weight of less than about 3,000.

A preferred hindered phenol compound contains at least one group of the formula

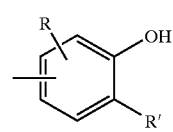

(ii)

per molecule wherein the benzene ring may be optionally further substituted with hydrocarbon groups having 1 to 24 carbon atoms. In formula (ii), R is an alkyl group having one to four carbon atoms and R' is a hydrocarbon group having 4 to 8 carbon atoms.

Preferably, one to four of the groups shown in structures (i) or (ii) are attached to an organic residue of appropriate valence such that the contemplated compound has a molecular weight (MW) of less than about 1,500. Most preferably, four such groups are present in component (D) and this compound has a molecular weight of less than about 1,200. This monovalent (or polyvalent) organic residue can contain one or more heteroatoms such as oxygen, nitrogen, phosphorous and sulfur. The R' groups in the above formula may be illustrated by t-butyl, n-pentyl, butenyl, hexenyl, cyclopentyl, cyclohexyl and phenyl. It is preferred that both R and R' are t-butyl. For the purposes of the present invention, a group according to formula (ii) can also be attached to hydrogen to form a diorganophenol.

Non-limiting specific examples of suitable hindered phenols include 1,1,3-Tris(2'-methyl-4'-hydroxy-5'-t-butylphenyl)butane, N,N'-hexamethylene bis(3-(3,5-di-t-butyl-4-hydroxyphenyl)propionamide), 4,4'-thiobis(2-t-butyl-5-methylphenol), 1,3,5-tris(4-tert-butyl-3-hydroxy-2,6-dimethyl benzyl)-1,3,5-triazine-2,4,6-(1H,3H,5H)-trione, N,N'-hexamethylenebis(3,5-di-tert-butyl-4-hydroxyhydrocinnamamide), tetrakis(methylene(3,5-di-tert-butyl-4-hydroxy-hydrocinnamate))methane, 1,3,5-trimethyl-2,4,6-tris (3,5-di-tert-butyl-4-hydroxybenzyl) benzene, 4,4'-methylenebis (2,6-di-tertiary-butylphenol), 2,2'-thiobis(6-tert-butyl-4-methylphenol), 2,2'-thiobis(4-octylphenol), 4,4'-thiobis(6-tert-butyl-2-methylphenol), 4,4'-thiobis(3,6-di-sec-amylphenol), 2-(4,6-bis(2,4-dimethylphenyl)-1,3,5,-triazin-2-yl)-5-(octyloxy) phenol, 2,4-bisoctylmercapto-6-(3,5-di-tert-butyl-4-hydroxyanilino)-1,3,5-triazine, 2,4,6-tris(3,5-di-tert -butyl-4-hydroxyphenoxy)-1,2,3-triazine, 1,3,5-tris(3,5-di-tert-butyl-4-hydroxybenzyl)isocyanurate, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2, 4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate, 1,3,5-tris(4-tert-butyl-3-hydroxy-2,6-dimethylbenzyl) isocyanurate, 2,6-di-tert-butyl-4-methoxyphenol, 2,5-di-tert-butylhydroquinone, 2,5-di-tert-amylhydroquinone, 2,6-di-tert-butylhydroquinone, 2,5-di-tert-butyl-4-hydroxyanisole, 2,6-diphenyl-4-octadecyloxyphenol, 3,5-di-tert-butyl-4-hydroxyanisole, 3,5-di-tert-butyl-4-hydroxyphenyl stearate, bis(3,5-di-tert-butyl-4-hydroxyphenyl)adipate, esters of beta-(3,5-di-tert-butyl-4-hydroxyphenyl)propionic acid with mono- or polyhydric alcohols (e.g., methanol, ethanol, n-octanol, trimethylhexanediol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, trimethylolpropane, tris(hydroxyethyl)isocyanurate, N,N'-bis(hydroxyethyl)oxalamide, 3-thiaundecanol, 3-thiapentadecanol, 4-hydroxymethyl-1-phospha-2,6,7-trioxabicyclo(2.2.2)octane and esters of beta-(5-tert-butyl-4-hydroxy-3-methylphenyl)propionic acid with mono- or polyhydric alcohols (as above).

Thioesters of the invention are compounds having at least one group of the formula

  (iii)

wherein

G is —CH$_2$—CH$_2$—C(O)OR''' and R''' is a monovalent hydrocarbon group having 1 to 24 carbon atoms. Specific non-limiting examples of suitable thioesters include distearyl 3,3'-thiodipropionate, dilauryl-3,3'-thiodipropionate and di(tridecyl)3,3'-thiodipropionate.

The hindered amine of the present invention is a low molecular weight organic compound or a polymer, which contains at least one divalent group of the formula

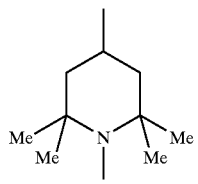  (iv)

wherein Me hereinafter denotes a methyl group. The backbone of this component is not critical as long as it does not contain functionality which would interfere with the dynamic vulcanization of the silicone gum and it may be illustrated by low-molecular and polymeric polyalkylpiperidines, as disclosed in U.S. Pat. No. 4,692,486, hereby incorporated by reference. Preferably, the above group has the structure

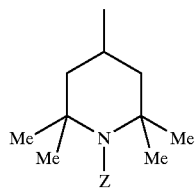  (v)

wherein Z is selected from hydrogen or an alkyl group having 1 to 24 carbon atoms, preferably hydrogen.

Specific non-limiting examples of suitable hindered amines include: 1,6-hexanediamine, N, N'-bis(2,2,6,6-pentamethyl-4-piperidinyl)-, polymers with morpholine-2,4,6-trichloro-1,3,5-triazine; 1,6-hexanediamine, N, N'-bis(2,2,6,6-tetramethyl-4-piperidinyl)-, polymers with 2,4,-Dichloro-6-(4- morpholinyl)-1,3,5-triazine; bis(1,2,2,6,6-pentamethyl-4-piperidinyl) sebacate; bis(2,2,6,6-tetramethyl-4-piperidinyl) sebacate; dimethyl succinate polymer with 4-hydroxy-2,2,6,6-tetramethyl-1-piperidine ethanol; and polymethyl (propyl-3-oxy-(2',2',6',6'-tetramethyl-4'-piperidinyl) siloxane.

Preferred stabilizers of the invention are tetrakis(methylene(3,5-di-tert-butyl-4-hydroxy-hydrocinnamate))methane, N,N'-hexamethylenebis(3,5-di-tert-butyl-4-hydroxyhydrocinnamamide) and 1,1,3-tris(2'-methyl-4'-hydroxy-5'-t-butylphenyl)butane. The most preferred stabilizer is tetrakis(methylene(3,5-di-tert-butyl-4-hydroxyhydrocinnamate)) methane.

When used, stabilizer compound (D) is added from 0.05 to 5 parts by weight for each 100 parts by weight of thermoplastic resin (A) and silicone base (B). Preferably 0.05 to 2 parts by weight, more preferably 0.2 to 1 parts by weight, of (D) are added for each 100 parts by weight of thermoplastic resin (A) and silicone base (B).

In addition to the above-mentioned components, other optional additives can be incorporated in the compositions of the present invention. Preferably, these optional component are added at a level of 0.5 to 40 weight percent based on the total composition, more preferably 0.5 to 20 weight percent. These optional additives can be illustrated by, but not limited to, reinforcing fillers for thermoplastic resins, such as glass fibers and carbon fibers; extending fillers, such as quartz, barium sulfate, talc, calcium carbonate, and diatomaceous earth; pigments, such as iron oxide and titanium oxide; electrically conducting fillers, such as carbon black and finely divided metals; lubricants; pigments; dyes; antistatic agents; blowing agents;heat stabilizers, such as hydrated cerric oxide; antioxidants; flame retardants, such as halogenated hydrocarbons, alumina trihydrate, magnesium hydroxide and organophosphorous compounds; and other fire retardant (FR) materials such as calcium silicate. The above additives are typically added to the final thermoplastic composition after dynamic cure, but they may also be added at any point in the preparation provided they do not interfere with the dynamic vulcanization mechanism. The above additional ingredients are only used at levels, which do not significantly detract from the desired properties of the final composition.

According to the method of the present invention, the thermoplastic elastomer is prepared by mixing silicone base (B), and if desired stabilizer (D) in thermoplastic resin (A) and dynamically vulcanizing the diorganopolysiloxane gum in the base using radical initiator (C). For the purposes of the present invention, the weight ratio of silicone base (B) to thermoplastic resin (A) is greater than 35:65. It has been found that when this ratio is 35:65 or less, the resulting vulcanizate generally has a modulus more resembling the thermoplastic resin than a thermoplastic elastomer. On the other hand, the above-mentioned ratio should be no more than about 85:15 since the compositions tend to be weak and resemble cured silicone elastomers above this value. Notwithstanding this upper limit, the maximum ratio of (B) to (A) for any given combination of components is also limited by processability considerations since too high a silicone base content results in at least a partially crosslinked continuous phase which is no longer thermoplastic. This practical limit is readily determined by routine experimentation and represents the highest level of component (B) which allows the TPSiV to be compression molded. It is, however, preferred that the final thermoplastic elastomer can also be readily processed in other conventional plastic operations, such as injection molding and extrusion and, in this case, the weight ratio of components (B) to (A) should be no more than about 75:25. Although the amount of silicone base consistent with the above mentioned requirements depends upon the particular resin and other components selected, it is preferred that the weight ratio of components (B) to (A) is 40:60 to 75:25, more preferably 40:60 to 70:30.

Mixing is carried out in any device, which is capable of uniformly dispersing the components in the thermoplastic resin, such as an internal mixer or a twin-screw extruder, the latter being preferred for commercial preparations. The temperature is preferably kept as low as practical consistent with good mixing so as not to degrade the resin. Depending upon the particular system, order of mixing is generally not critical. However, it is preferred to mix component (C) with (B) at room temperature before adding this combination to a blend of components (A) and (D) at a process temperature sufficient to initiate dynamic vulcanization. Alternatively, components (B), and (D) can be mixed in resin (A) before adding component (C) to initiate dynamic vulcanization. As previously mentioned, it is also contemplated that the silicone base can be formed in-situ. For example, the reinforcing filler may be added to a mixer already containing the thermoplastic resin and diorganopolysiloxane gum at a temperature below the softening point of the resin to thoroughly disperse the filler in the gum. The temperature is then raised to melt the resin, the other ingredients are added and dynamic vulcanization is carried out. Optimum temperatures, mixing times and other conditions of the mixing operation depend upon the particular resin and other components under consideration and these may be determined by routine experimentation by those skilled in the art. It is, however, preferred to carry out the mixing and dynamic vulcanization under a dry, inert atmosphere such as dry nitrogen, helium or argon.

As noted above, in order to be within the scope of the present invention, the tensile strength or elongation, or both, of the TPSiV elastomer formed by the present method must be at least 25% greater than that of a corresponding simple blend. A requirement of the invention is that the TPSiV has at least 25% elongation, as determined by the test described infra. In this context, the term "simple blend" (or physical blend) denotes a composition wherein the weight proportions of resin (A) and base (B) are identical to the proportions in the TPSiV, but no initiators are employed (i.e., no component C). In order to determine if a particular composition meets the above criterion, the tensile strength of the TPSiV is measured on dumbbells having a length of 25.4 mm and a width of 3.2 mm and a typical thickness of 1 to 2 mm, according to ASTM method D 412, at an extension rate of 50 mm/min. At least three such samples are evaluated and the results averaged after removing obvious low readings due to sample inhomogeneity (e.g., such as voids, contamination or inclusions). These values are then compared to the corresponding average tensile and elongation values of a sample prepared from the simple blend composition. When at least a 25% improvement in tensile and/or elongation over the simple blend is not realized there is no benefit derived from the dynamic vulcanization and such TPSiVs are not within the scope of the present invention.

The thermoplastic elastomer prepared by the above-described method can then be processed by conventional techniques, such as extrusion, vacuum forming, injection molding, blow molding, overmolding or compression molding. Moreover, these compositions can be re-processed (recycled) with little or no degradation of mechanical properties.

The compositions prepared by the present invention can be fabricated into useful elastomeric articles (e.g., heat resistant enclosures) by a variety of conventional operations, such as compression molding, injection molding, blow molding and extrusion. The resulting parts may be used in various applications in transportation, construction, electronic, electrical, communications, consumer packaging, medical, appliance, recreation, entertainment, agriculture, and life science industries. Specific examples include automotive under-the-hood-components, such as air ducts, fuel line covers, steering bellows, engine seals, CVJ boots and oil filler seals; automotive body and chassis components, such as weather seals, window seals, light seals and over-slam bumpers; automotive interior components, such as air bag door covers and interior console mats; aircraft components, such as connectors, connector seals, engine seals, fuel line covers, and weather seals; gaskets and parts for dishwashers, washing machines, dryers, vacuum cleaners, curtain walls, and skylights; building, road or bridge expansion joints; residential and commercial door and window weather stripping; packaging for foods, beverages, cosmetics, toiletries, and pharmaceuticals; wire and cable jacketing, connectors, and housings; home filtration, home plumbing or industrial hose; irrigation seals; pipe couplings; spa and pool seals; grips for cutlery, toothbrushes, hand tools and power tools; sporting goods components; kitchen tools; storage containers, lids, and seals; medical syringe plunger tips; blood tube and drug vial stoppers; intravenous kits; baby bottle nipples and pacifiers; defibrillator components and cable jacketing for EKG and ECG monitoring devices; laser surgery pencil components; hand and power tool casing; lawn and garden equipment components; enclosures for telecommunication devices as well as for indoor and outdoor digital display screens; and architectural glazing seals.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 230° C., unless indicated to the contrary.

Materials

The following materials were employed in the examples.

SILICONE BASE is a silicone rubber base made from 68.78% PDMS 1, defined infra, 25.8% of a fumed silica having a surface area of about 250 $m^2/g$ (Cab-O-Sil® MS-75 by Cabot Corp., Tuscola, IL.), 5.4% of a hydroxy-terminated diorganopolysiloxane gum having an average degree of polymerization (DP) of about 8 and 0.02% of ammonium carbonate.

INITIATOR 1 is 2,5-dimethyl-2,5-di-(tert-butylperoxy) hexane having a T(6) of 158° C.; Trigonox™ 101, obtained from Akzo Nobel Chemicals Inc., Chicago, Ill.

INITIATOR 2 is bis(1-methyl-1-phenylethyl) peroxide having a T(6) of 154–156° C.; dicumyl peroxide, obtained from Aldrich Chemical Co., Milwaukee, Wis.

INITIATOR 3 is 2,5-dimethyl-2,5-di-(tert-butylperoxy) hexyne-3 having a T(6) of 164° C.; Lupersol™ 130, obtained from Schibley Chemical Co., Elyria, Ohio.

IRGANOX™ 1010 is a hindered phenol stabilizer marketed by Ciba Specialty Chemicals Corporation and described as tetrakis {methylene(3,5-di-tert-butyl-4-hydroxy-hydrocinnamate) } methane.

PDMS 1 is a silicone gum consisting of 99.81 wt % $Me_2SiO$ units, 0.16% $MeViSiO$ units and 0.03% $Me_2ViSiO_{1/2}$ units, wherein Me and Vi denote methyl and vinyl, respectively. PDMS 1 is prepared by potassium catalyzed equilibration of cyclic siloxanes wherein the catalyst is neutralized with carbon dioxide. This gum has plasticity of about 150.

PE is polyethylene obtained from Dow Chemical Co. as Dow 50041.

Comparative Example 1

PE (77.6 g) was melted at 130° C. at 60 revolutions per minute (rpm) in a Haake System 9000® miniaturized internal mixer (300 mL bowl) under a dry nitrogen atmosphere (0.014 m³/minute) using roller blades. SILICONE BASE (116.4 g) was then added at 3 minutes, after 5 minutes, the mixer torque was constant at approximately 3,200 m-g. Mixing was stopped at 10 minutes and the resulting physical blend was removed from the bowl.

A sample of the above material was compression molded at 150° C. for 3 minutes under approximately 10 ton pressure (99 KPa) in a stainless steel Endura® 310-2 coated mold followed by cold pressing for 3 minutes. The tensile properties were measured on dumbbells having a gauge length of 33 mm, a width of 3 mm and a thickness of 1 to 2 mm, according to ASTM method D 412 and at an extension rate of 50 mm/min. At least 3 samples were tested, the results were averaged and are presented in Table 1.

(Comparative) Example 2

PE (77.6 g) was melted at 130 ° C. at 60 revolutions per minute (rpm) in a Haake System 9000™ miniaturized internal mixer (300 mL bowl) under a dry nitrogen atmosphere (0.014 m³/minute) using roller blades. After 3 minutes, SILICONE BASE (116.4 g) was added and mixed for approximately 2.5 minutes, then IRGANOX™ 1010 (0.94 g) was mixed in. After 6 minutes, the mixer torque was constant at approximately 3,200 m-g. Mixing was stopped after 12 minutes, and the resulting physical blend was removed from the bowl. The resulting material was compression molded and tested as in (Comparative) Example 1. The results are summarized in Table 1.

Example 3

PE (76.9 g), and SILICONE BASE (115.2 g) were mixed according to (Comparative) Example 1. After 5.5 minutes, INITIATOR 1 (1.93 g) was added dropwise and the torque increased to 8000 m-g. The run was stopped after 18 minutes and the resulting material was again compression molded and tested according to (Comparative) Example A1. The results are shown in Table 1.

Example 4

PE (76.9 g), SILICONE BASE (115.2 g) and IRGANOX™ 1010 (0.94 g) were mixed according to (Comparative) Example 2. After 7.5 minutes, INITIATOR 1 (1.96 g) was added dropwise and the torque increased to 4,400 m-g. The run was stopped after 15 minutes and the resulting material was again compression molded and tested according to (Comparative) Example A1. The results are shown in Table 1.

Example 5

PE (76.9 g), and SILICONE BASE(115.2 g) were mixed according to (Comparative) Example 1. After 5.5 minutes INITIATOR 2 (1.94 g) was added dropwise and the torque increased to 9,000 m-g. The run was stopped after 18 minutes and the resulting material was again compression molded and tested according to (Comparative) Example A1. The results are shown in Table 1.

Example 6

PE(76.9 g), SILICONE BASE(115.2 g) and IRGANOX™ 1010 (0.94 g) were mixed according to (Comparative) Example 2. After 7.5 minutes, INITIATOR 2 (1.94 g) was added dropwise and the torque increased to 4,800 m-g. The run was stopped after 15 minutes and the resulting material was again compression molded and tested according to (Comparative) Example A1. The results are shown in Table 1.

TABLE 1

| | Example | | | | | |
|---|---|---|---|---|---|---|
| | 1 Comparative | 2 Comparative | 3 | 4 | 5 | 6 |
| Composition: | | | | | | |
| BASE 1 (g) | 116.4 | 116.4 | 115.2 | 115.2 | 115.2 | 115.2 |
| PE (g) | 77.6 | 77.6 | 76.9 | 76.9 | 76.9 | 76.9 |
| IRGANOX ™ 1010 (g) | 0 | 0.94 | 0 | 0.94 | 0 | 0.94 |
| INITIATOR 1 (g) | 0 | 0 | 1.93 | 1.96 | 0 | 0 |
| INITIATOR 2 (g) | 0 | 0 | 0 | 0 | 1.94 | 1.94 |
| Properties: | | | | | | |
| Tensile Strength (MPa) | 3.0 | 2.8 | 8.6 | 5.0 | 12.1 | 5.6 |
| Elongation (%) | 78 | 55 | 440 | 365 | 498 | 407 |
| Ultimate torque (m-g) | 3,200 | 3,200 | 8,000 | 4,400 | 9,000 | 4,800 |

Example 7

PE (76.9 g), SILICONE BASE (115.2 g), and IRGANOX™ 1010(0.94 g) were mixed according to (Comparative) Example A2. After 7.5 minutes, INITIATOR 2 (0.97 g) was added dropwise and the torque increased to 4,800 m-g. The run was stopped after 12 minutes and the resulting material was again compression molded and tested according to (Comparative) Example A1. The results are shown in Table 2.

Example 8

PE (76.9 g), SILICONE BASE (115.2 g), and IRGANOX™ 1010(0.94 g) were mixed according to (Comparative) Example A2. After 7.5 minutes, INITIATOR 1 (0.95 g) was added dropwise and the torque increased to 4,000 m-g. The run was stopped after 13 minutes and the resulting material was again compression molded and tested according to (Comparative) Example A1. The results are shown in Table 2.

Example 9

PE (76.9 g), SILICONE BASE(115.2 g), and IRGANOX™ 1010 (0.94 g) were mixed according to (Comparative) Example A2. After 7.5 minutes, INITIATOR 3 (0.98 g) was added dropwise and the torque increased to 4,000 m-g. The run was stopped after 16 minutes and the resulting material was again compression molded and tested according to (Comparative) Example A1. The results are shown in Table 2.

Example 10

PE (76.9 g), SILICONE BASE(115.2 g), and IRGANOX™ 1010 (0.94 g) were mixed according to (Comparative) Example A2. After 7.5 minutes, INITIATOR 3 (1.94 g) was added dropwise and the torque increased to 3,800 m-g. The run was stopped after 16 minutes and the resulting material was again compression molded and tested according to (Comparative) Example A1. The results are shown in Table 2.

TABLE 2

|  | Example | | | |
| --- | --- | --- | --- | --- |
|  | 7 | 8 | 9 | 10 |
| Composition: | | | | |
| BASE 1 (g) | 115.2 | 115.2 | 115.2 | 115.2 |
| PE (g) | 76.9 | 76.9 | 76.9 | 76.9 |
| IRGANOX ™ 1010 (g) | 0.94 | 0.94 | 0.94 | 0.94 |
| INITIATOR 1 (g) | 0 | 0.95 | 0 | 0 |
| INITIATOR 2 (g) | 0.97 | 0 | 0 | 0 |
| INITIATOR 3 (g) | 0 | 0 | 0.98 | 1.94 |
| Properties: | | | | |
| Tensile Strength (MPa) | 3.9 | 3.0 | 2.6 | 2.8 |
| Elongation (%) | 234 | 92 | 48 | 102 |
| Ultimate torque (m-g) | 4,800 | 4,000 | 4,000 | 3,800 |

Cold Blending Technique 1

To a clean, room temperature Haake System 9000™ miniaturized internal mixer (300 mL bowl) running at a speed of 40 revolutions per minute (rpm), under a dry nitrogen atmosphere (0.014 m$^3$/minute), SILICONE BASE (202.2 g) was added, after 2.8 minutes, IRGANOX™ 1010 (1.65 g) was added to the above silicone base. After a total elapsed time of 4.8 minutes, INITIATOR was added, completing this blend. After 6 minutes the torque was constant at 4,400 m-g. Mixing was then stopped after 11 minutes, and the resulting cold blend removed from the bowl.

Example 11

PE (76.9 g) was melted at 150° C. in a Haake System 9000® miniaturized internal mixer under a dry nitrogen atmosphere (0.014 m$^3$/minute), running at a speed of 60 revolutions per minute (rpm). After 4 minutes, 117.1 g of the cold blend prepared using Cold Blending Technique 1 (INITIATOR 1 (0.99 g)), was added to the mixer. This 117.1 g of cold blend contained 0.99 g of Initiator 1. After 9 minutes the torque increased to 6,400 m-g. The run was stopped after 13 minutes, and the resulting material was again compression molded and tested according to (Comparative) Example A1. The results are shown in Table 3.

Example 12

PE (76.9 g) was melted at 150° C. in a Haake System 9000® miniaturized internal mixer under a dry nitrogen atmosphere (0.014 m$^3$/minute), running at a speed of 60 revolutions per minute (rpm). After 4 minutes, 117.2 g of the cold blend prepared using Cold Blending Technique 1, was added to the mixer. This 117.2 g of cold blend contained 0.97 g of Initiator 3. After 12 minutes the torque increased to 5,600 m-g. The run was stopped after 13 minutes, and the resulting material was again compression molded and tested according to (Comparative) Example A1. The results are shown in Table 3.

Example 13

PE (76.9 g) was melted at 150° C. in a Haake System 9000™ miniaturized internal mixer under a dry nitrogen atmosphere (0.014 m$^3$/minute), running at a speed of 60 revolutions per minute (rpm). After 4 minutes, 117.1 g of the cold blend prepared using Cold Blending Technique 1, was added to the mixer. This 117.1 g of cold blend contained 1.92 g of Initiator 1. After 12 minutes the torque increased to 6,500 m-g. The run was stopped 14 minutes, and the resulting material was again compression molded and tested according to (Comparative) Example A1. The results are shown in Table 3.

Example 14

PE (76.9 g) was melted at 150° C. in a Haake System 9000™ miniaturized internal mixer under a dry nitrogen atmosphere (0.014 m$^3$/minute), running at a speed of 60 revolutions per minute (rpm). After 4 minutes, 117.2 g of the cold blend prepared using Cold Blending Technique 1, was added to the mixer. This 117.2 g of cold blend contained 1.92 g of Initiator 3. After 12 minutes the torque increased to 6,000 m-g. The run was stopped after 14 minutes, and the resulting material was again compression molded and tested according to (Comparative) Example A1. The results are shown in Table 3.

TABLE 3

|  | Example | | | |
| --- | --- | --- | --- | --- |
|  | 11 | 12 | 13 | 14 |
| Composition: | | | | |
| BASE 1 (g) | 115.2 | 115.4 | 114.3 | 114.4 |
| PE (g) | 76.9 | 76.9 | 76.9 | 76.9 |
| IRGANOX ™ 1010 (g) | 0.94 | 0.94 | 0.93 | 0.93 |
| INITIATOR 1 (g) | 0 | 0.99 | 0 | 0 |
| INITIATOR 2 (g) | 0.97 | 0 | 0 | 1.92 |
| INITIATOR 3 (g) | 0 | 0 | 0.97 | 0 |
| Properties: | | | | |
| Tensile Strength (MPa) | 4.4 | 3.3 | 4.8 | 3.5 |
| Elongation (%) | 227 | 141 | 264 | 135 |
| Ultimate torque (m-g) | 6,400 | 5,600 | 6,500 | 6,000 |

Example 15

PE (76.9 g) was melted at 150° C. in a Haake System 9000™ miniaturized internal mixer under a dry nitrogen atmosphere (0.014 m$^3$/minute), running at a speed of 60 revolutions per minute (rpm). After 4 minutes, 117.1 g of the cold blend prepared using Cold Blending Technique 1, was added to the mixer. This 117.3 g of cold blend contained 0.97 g of Initiator 2. After 12 minutes the torque increased to 8,000 m-g. The run was stopped after 14 minutes, and the resulting material was again compression molded and tested according to (Comparative) Example A1. The results are shown in Table 4.

Example 16

PE (76.9 g) was melted at 150° C. in a Haake System 9000™ miniaturized internal mixer under a dry nitrogen atmosphere (0.014 m³/minute), running at a speed of 60 revolutions per minute (rpm). After 4 minutes, 117.2 g of the cold blend prepared using Cold Blending Technique 1, was added to the mixer. This 117.2 g of cold blend contained 1.92 g of Initiator 2. After 12 minutes the torque increased to 8,800 m-g. The run was stopped after 14 minutes, and the resulting material was again compression molded and tested according to (Comparative) Example A1. The results are shown in Table 4.

Cold Blending Technique 2

To a clean, dry nitrogen purged (0.014 m³/minute), room temperature Haake System 9000™ miniaturized internal mixer (300 mL bowl) running at a speed of 40 revolutions per minute (rpm), SILICONE BASE (202.3 g) was added. After 2.8 minutes, INITIATOR was added, completing this blend. After 2.8 minutes the torque decreased to a constant of 4,800 m-g. Mixing was then stopped after 10 minutes, and the resulting cold blend removed from the bowl.

Example 17

PE (77.6 g) was melted at 150° C. in a Haake System 9000™ miniaturized internal mixer under a dry nitrogen atmosphere (0.014 m³/minute), running at a speed of 60 revolutions per minute (rpm). After 4 minutes, 116.4 g of the cold blend prepared using Cold Blending Technique 2, was added to the mixer. This 116.4 g of cold blend contained 0.97 g of Initiator 2. After 8 minutes the torque increased to 8,800 m-g. The run was stopped after 13 minutes and the resulting material was again compression molded and tested according to (Comparative) Example A1. The results are shown in Table 4.

Example 18

PE (77.6 g ) was melted at 150° C. in a Haake System 9000™ miniaturized internal mixer under a dry nitrogen atmosphere (0.014 m³/minute), running at a speed of 60 revolutions per minute (rpm). After 4 minutes, 116.5 g of the cold blend prepared using Cold Blending Technique 2, was added to the mixer. This 116.5 g of cold blend contained 1.93 g of Initiator 2. After 6 minutes the torque increased to 9,000 m-g. The run was stopped after 12 minutes and the resulting material was again compression molded and tested according to (Comparative) Example A1. The results are shown in Table 4.

TABLE 4

| | Example | | | |
|---|---|---|---|---|
| | 15 | 16 | 17 | 18 |
| Composition: | | | | |
| BASE 1 (g) | 115.2 | 114.3 | 115.4 | 114.6 |
| PE (g) | 76.9 | 76.9 | 77.6 | 77.6 |
| IRGANOX ™ 1010 (g) | 0.94 | 0.94 | 0 | 0 |
| INITIATOR 2 (g) | 0.97 | 1.92 | 0.97 | 1.93 |
| Properties: | | | | |
| Tensile Strength (MPa) | 6.8 | 7.7 | 7.3 | 6.7 |
| Elongation (%) | 349 | 325 | 283 | 201 |
| Ultimate torque (m-g) | 8,000 | 8,800 | 8,800 | 9,000 |

That which is claimed is:

1. A method for preparing a thermoplastic elastomer comprising:
    (I) mixing
        (A) a thermoplastic resin comprising more than 50 percent by volume of a polyolefin resin, said thermoplastic resin having a softening point of 23° C. to 300° C.;
        (B) a silicone base comprising
            (B') 100 parts by weight of a diorganopolysiloxane gum having a plasticity of at least 30 and having an average of at least 2 alkenyl groups per molecule, and optionally,
            (B") up to 200 parts by weight of a reinforcing filler, wherein the weight ratio of said silicone base to said thermoplastic resin is from 35:65 to 85:15;
        (C) a radical initiator, in an amount sufficient to cure said diorganopolysiloxane gum (B'); and
    (II) dynamically vulcanizing said diorganopolysiloxane gum,
wherein said thermoplastic elastomers have an elongation of at least 25% and at least one property of said thermoplastic elastomers selected from tensile strength or elongation is at least 25% greater than the respective property for a corresponding simple blend wherein said diorganopolysiloxane gum is not cured.

2. The method of claim 1 wherein step (I) further comprises the addition of
    (D) 0.05 to 5 parts by weight of a stabilizer compound for each 100 parts by weight of said thermoplastic and said silicone base.

3. The method of claim 1 wherein the polyolefin resin is a polyethylene or polypropylene resin.

4. The method of claim 1 wherein the polyolefin resin is selected from styrene-butadiene-styrene block copolymers, styrene-ethylene-butylene-styrene copolymers, or styrene-isoprene-styrene copolymers.

5. The method of claim 2 wherein the polyolefin resin is a polyethylene or polypropylene resin.

6. The method of claim 2 wherein the polyolefin resin is selected from styrene-butadiene-styrene block copolymers, styrene-ethylene-butylene-styrene, or styrene-isoprene-styrene copolymers.

7. The method of claim 1 wherein the ratio of said silicone base (B) to said polyolefin resin is between 40:60 to 70:30.

8. The method of claim 1 wherein the radical initiator is an organic peroxy compounds, selected from hydroperoxides, diacyl peroxides, ketone peroxides, peroxyesters, dialkyl peroxides, diaryl peroxides, aryl-alkyl peroxides, peroxydicarbonates, peroxyketals, peroxy acids, acyl alkylsulfonyl peroxides or alkyl monoperoxydicarbonates.

9. The method of claim 2 wherein the radical initiator is an organic peroxy compound selected from hydroperoxides, diacyl peroxides, ketone peroxides, peroxyesters, dialkyl peroxides, diaryl peroxides, aryl-alkyl peroxides, peroxydicarbonates, peroxyketals, peroxy acids, acyl alkyl-sulfonyl peroxides or alkyl monoperoxydicarbonates.

10. The method according to claim 2, wherein said stabilizer is a hindered phenol having at least one group of the formula

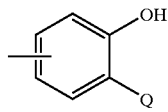

per molecule, in which Q is a monovalent organic group having 1 to 24 carbon atoms selected from
 (i) hydrocarbon groups,
 (ii) hydrocarbon groups which optionally contain heteroatoms selected from sulfur, nitrogen or oxygen or
 (iii) halogen-substituted versions of (i) or (ii),
wherein the benzene ring of said formula may additionally be substituted with at least one Q group.

11. The method according to claim 2, wherein said stabilizer is a hindered phenol having at least one group of the formula

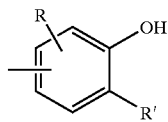

per molecule, wherein R is an alkyl group having one to four carbon atoms, R' is a hydrocarbon group having 4 to 8 carbon atoms and wherein the benzene ring of said formula may be optionally further substituted with a hydrocarbon group having 1 to 24 carbon atoms.

12. The method according to claim 11, wherein said stabilizer is a hindered phenol selected from tetrakis (methylene(3,5-di-tert-butyl-4-hydroxy-hydrocinnamate)) methane, N,N'-hexamethylenebis {3-(3,5-di-tert-butyl-4-hydroxyphenyl)propionamide}, or 1,1,3-tris(2'-methyl-4'-hydroxy-5'-t-butylphenyl)butane.

13. The method according to claim 12, wherein said stabilizer is tetrakis(methylene(3,5-di-tert-butyl-4-hydroxy-hydrocinnamate))methane.

14. The method according to claim 2 wherein the polyolefin is polyethylene, the ratio of said silicone base (B) to said polyolefin resin is between 40:60 to 70:30, and the stabilizer is tetrakis(methylene(3,5-di-tert-butyl-4-hydroxy-hydrocinnamate))methane.

15. A method for preparing a thermoplastic elastomer comprising:
 (I) mixing
  (A) a thermoplastic resin comprising more than 50 percent by volume of a polyolefin resin, said thermoplastic resin having a softening point of 23° C. to 300° C.;
 (B) a silicone base comprising (B') 100 parts by weight of a diorganopolysiloxane gum having a plasticity of at least 30, and optionally,
  (B") up to 200 parts by weight of a reinforcing filler, wherein the weight ratio of said silicone base to said thermoplastic resin is from 35:65 to 85:15;
 (C) a radical initiator, in an amount sufficient to cure said diorganopolysiloxane gum (B'); and
(II) dynamically vulcanizing said diorganopolysiloxane gum,
wherein said thermoplastic elastomers have an elongation of at least 25% and at least one property of said thermoplastic elastomers selected from tensile strength or elongation is at least 25% greater than the respective property for a corresponding simple blend wherein said diorganopolysiloxane gum is not cured.

16. The method of claim 15 wherein said diorganopolysiloxanes gum is a polydimethylsiloxane homopolymer having terminal hydroxy or methyl groups.

17. A thermoplastic elastomer prepared according to the method of claim 1.

18. A thermoplastic elastomer prepared according to the method of claim 2.

19. A thermoplastic elastomer prepared according to the method of claim 3.

20. A thermoplastic elastomer prepared according to the method of claim 4.

21. A thermoplastic elastomer prepared according to the method of claim 5.

22. A thermoplastic elastomer prepared according to the method of claim 6.

23. A thermoplastic elastomer prepared according to the method of claim 7.

24. A thermoplastic elastomer prepared according to the method of claim 8.

25. A thermoplastic elastomer prepared according to the method of claim 9.

26. A thermoplastic elastomer prepared according to the method of claim 10.

27. A thermoplastic elastomer prepared according to the method of claim 11.

28. A thermoplastic elastomer prepared according to the method of claim 12.

29. A thermoplastic elastomer prepared according to the method of claim 13.

30. A thermoplastic elastomer prepared according to the method of claim 14.

31. A thermoplastic elastomer prepared according to the method of claim 15.

32. A thermoplastic elastomer prepared according to the method of claim 16.

* * * * *